(12) United States Patent
Narusawa et al.

(10) Patent No.: US 6,798,601 B2
(45) Date of Patent: Sep. 28, 2004

(54) IMPACT DETECTING CIRCUIT, IMPACT DETECTING APPARATUS, AND RECORDING AND REPRODUCING APPARATUS INCLUDING SAME

(75) Inventors: Keiji Narusawa, Kanagawa (JP); Koichi Kobe, Kanagawa (JP)

(73) Assignee: Sony Corporation (JP)

( * ) Notice: Subject to any disclaimer, the term of this patent is extended or adjusted under 35 U.S.C. 154(b) by 243 days.

(21) Appl. No.: 10/184,878

(22) Filed: Jul. 1, 2002

(65) Prior Publication Data

US 2003/0039053 A1 Feb. 27, 2003

(30) Foreign Application Priority Data

Jul. 4, 2001 (JP) .................................. P2001-202876

(51) Int. Cl.[7] .............................................. G11B 19/02
(52) U.S. Cl. ...................................................... 360/69
(58) Field of Search ............................... 360/69, 75, 71

(56) References Cited

U.S. PATENT DOCUMENTS 6,212,026 B1 * 4/2001 Ohmi et al. .................. 360/60

* cited by examiner

Primary Examiner—David Hudspeth
Assistant Examiner—Mitchell Slavitt
(74) Attorney, Agent, or Firm—Rader, Fishman & Grauer PLLC; Ronald P. Kananen (57) ABSTRACT

First and second integrating circuits are connected to both terminals of an impact sensor, and a difference between integration outputs of the integrating circuits is obtained by a differential amplifier. Voltage waveforms result from an input offset voltage in output terminals of the first and second integrating circuits and thereby cancel each other out. In essential impact detection, a comparator compares a differential output of the differential amplifier with a threshold level, whereby impact detection is performed.

14 Claims, 6 Drawing Sheets

IMPACT DETECTING CIRCUIT, IMPACT DETECTING APPARATUS, AND RECORDING AND REPRODUCING APPARATUS INCLUDING SAME

BACKGROUND OF THE INVENTION

The present invention relates to an impact detecting circuit that detects an impact on the basis of an output signal of an impact sensor, an impact detecting apparatus including the impact sensor and the impact detecting circuit, and a recording and reproducing apparatus including the impact detecting apparatus.

A 2.5-inch or smaller HDD (Hard Disk Drive) apparatus included in a portable apparatus, such as a notebook personal computer (so-called notebook PC) or the like, includes an impact sensor and an impact detecting circuit. The impact sensor and the impact detecting circuit are provided to prevent the destruction of recorded information, for example, when a head unit in a recording mode moves on impact to an area where information is already recorded and performs a recording operation at that position.

The HDD apparatus is a kind of recording and reproducing apparatus for recording information on a disk-shaped recording medium and reproducing the recorded information from the recording medium. The HDD apparatus uses a hard disk as the recording medium. An outline of a configuration of the HDD apparatus will be described with reference to FIG. 3.

Figure 3:
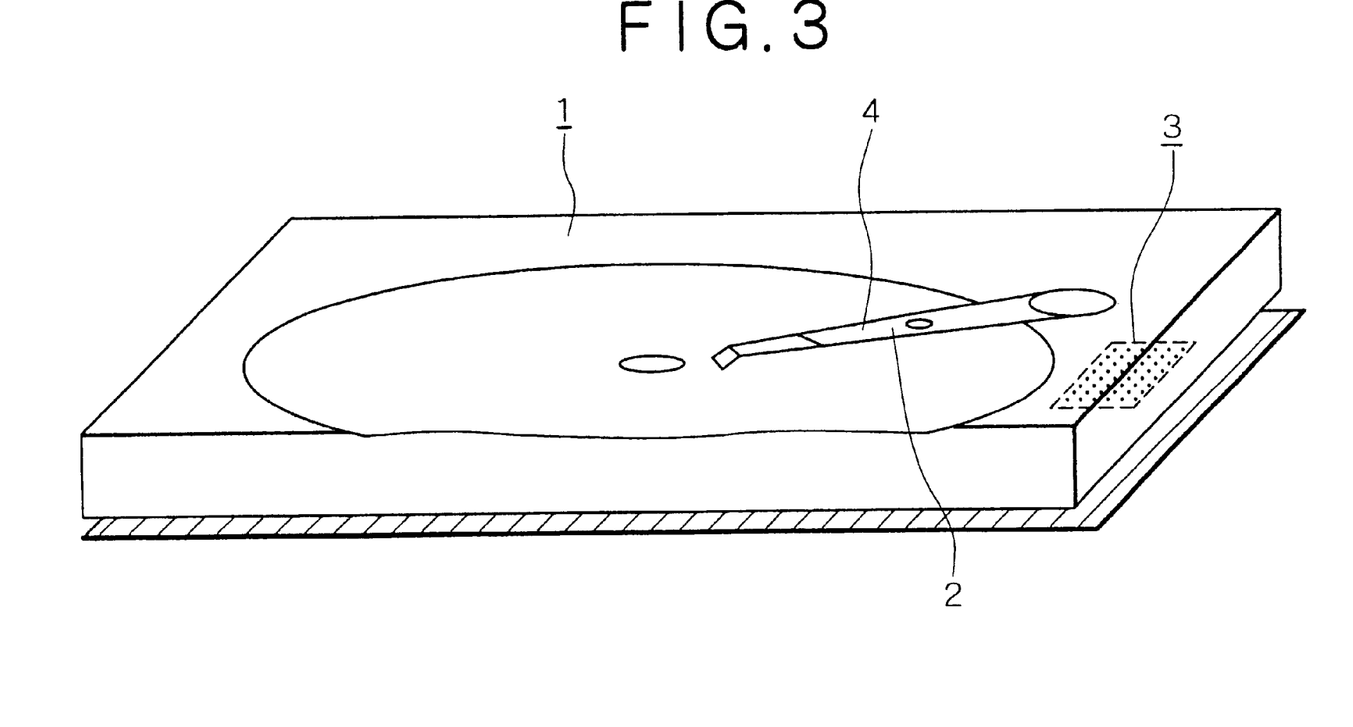
FIG. 3 is a schematic perspective view of a configuration of a HDD apparatus.

In FIG. 3, a head unit for recording information and reproducing the recorded information on a disk is disposed within an enclosure 1. The head unit is formed by a recording head (for example, an inductive head) and a reproducing head (for example, a magnetoresistive head). The head unit is supported by a head arm 4, so as to be movable in a direction of a radius of the disk. A signal to be recorded on the disk or a signal read from the disk is transferred between the head unit and a signal processing IC (recording/reproducing IC) 3 included within the enclosure 1.

With the HDD apparatus thus formed, an impact sensor is conventionally mounted on a main board external to the enclosure 1. The main board is mounted with an impact detecting circuit (IC) for processing a signal from the impact sensor and outputting a detection signal when detecting an impact of a predetermined value or higher and other circuits.

However, when the impact sensor is mounted on the main board external to the enclosure 1, as described above, the board somewhat absorbs the force of an impact because the board is generally flexible. Therefore, it is not possible to detect the impact accurately. In addition, while a part around the head unit is to be protected from an impact, the impact sensor is mounted at a position distant from the head unit. From such a viewpoint, it is desirable to dispose the impact sensor within the enclosure 1.

Also, there has recently been a trend toward smaller HDD apparatus, for example, 1.8-inch and 1-inch HDD apparatuses. When the HDD apparatus thus becomes smaller, the main board attached to the enclosure 1 naturally becomes smaller too, thus reducing the space (both area and height) for disposing the impact sensor. Also from this viewpoint, it is necessary to dispose the impact sensor within the enclosure 1.

On the other hand, it may be said to be desirable to dispose the impact detecting circuit at a position adjacent to the impact sensor. This is because a signal generated on impact from the impact sensor is very weak, and noise tends to be superimposed on a long transmission line between the impact sensor and the impact detecting circuit, so that erroneous operation due to the noise needs to be prevented.

However, since the signal processing IC (recording/reproducing IC) 3 is included within the enclosure 1, as described above, the enclosure 1 actually has no space for disposing the impact detecting circuit (IC). Accordingly, integration of the recording/reproducing IC and the impact detecting IC into a single chip is conceivable. In the following, a circuit configuration of an impact detecting circuit according to a conventional example will be described.

Figure 4:
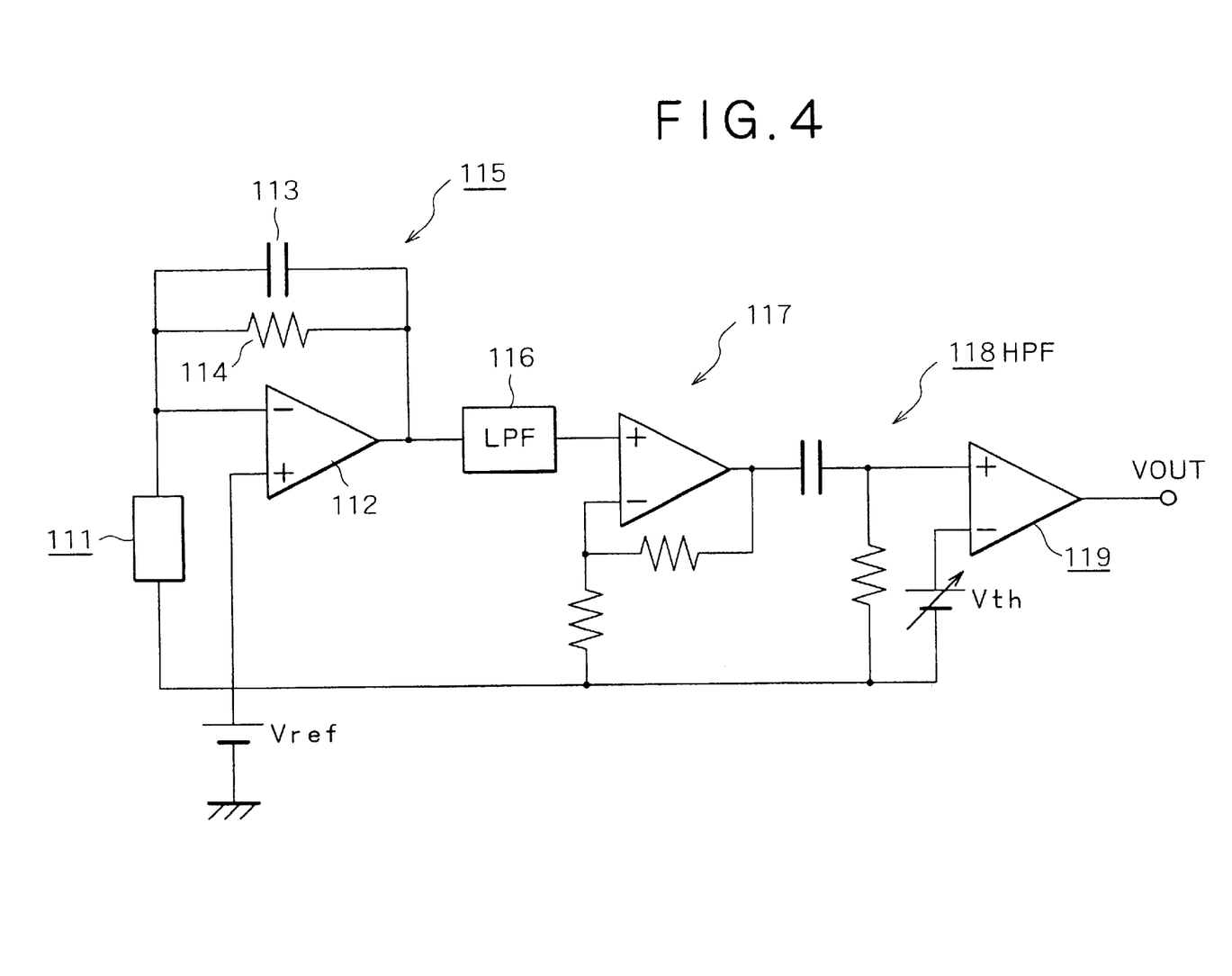
FIG. 4 is a circuit diagram showing an example of a circuit configuration of an impact detecting circuit according to a conventional example.

FIG. 4 is a circuit diagram showing an example of a circuit configuration of an impact detecting circuit according to a conventional example. An impact sensor 111 in FIG. 4 outputs a first-order differential current in proportion to impact strength. The first-order differential current is subjected to first-order integration by an integrating circuit 115 formed by an operational amplifier 112, a capacitor 113, and a resistance 114 and converted into a voltage with a flat frequency characteristic.

Then, an LPF (Low Pass Filter) 116 cuts off a high-frequency component unnecessary for impact detection, and then the result is amplified by an amplifier 117. A HPF (High Pass Filter) 118 having a sufficiently low cutoff frequency eliminates a DC offset component, and then the result is supplied to a comparator 119 as a non-inverting (+) input of the comparator 119. The comparator 119 uses a threshold level Vth as an inverting (−) input of the comparator 119. An impact detection level is set by adjusting the threshold level Vth.

In this case, for example, supposing that an impact of 1 G and 1 kHz is applied, the impact sensor 111 outputs a current of a magnitude of 1 nA, and the integrating circuit 115 outputs a voltage of a magnitude of 1 mV.

Figure 5:
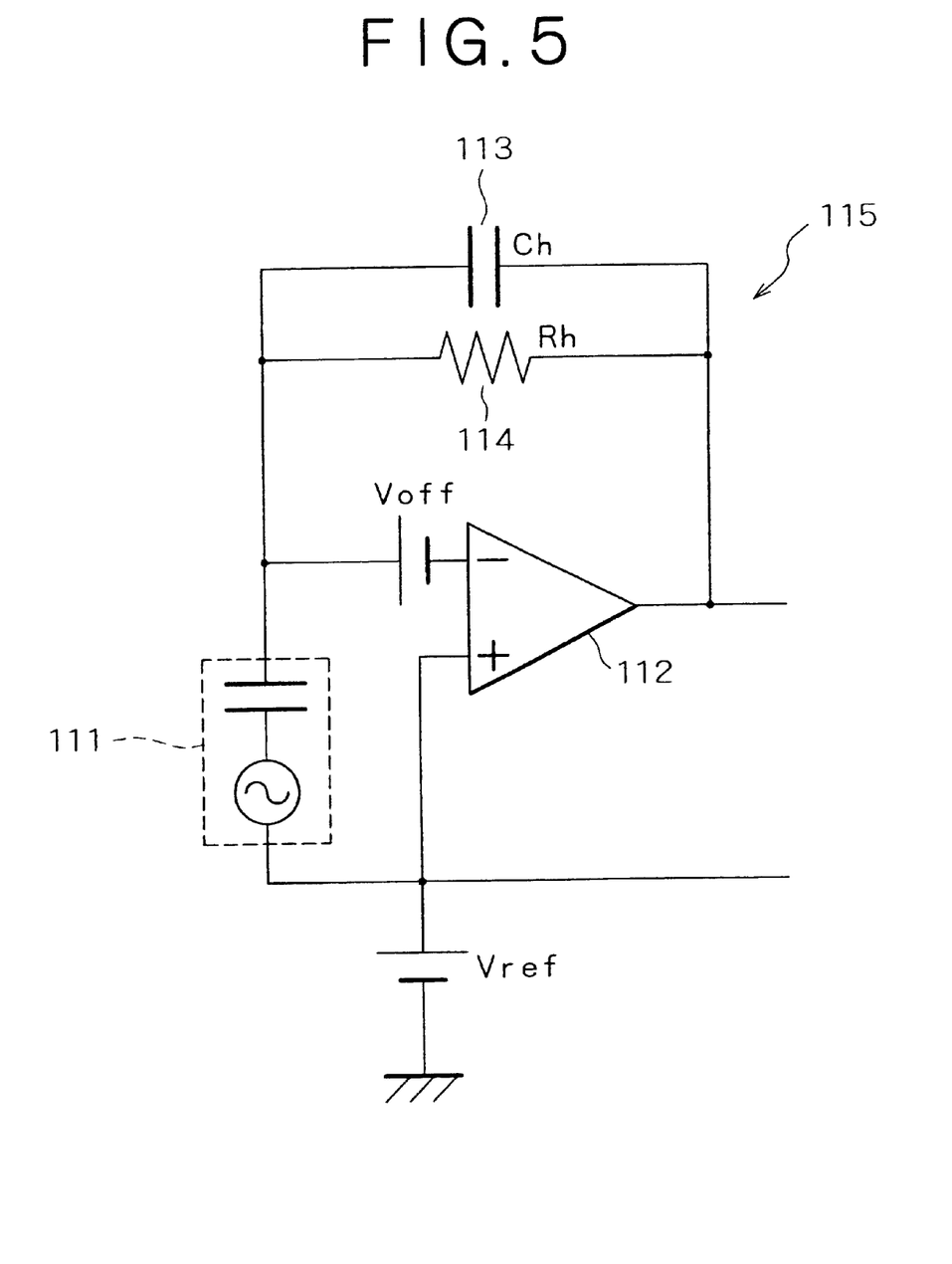
FIG. 5 is a diagram of equivalent circuits of an impact sensor and an integrating circuit.

When the thus formed impact detecting circuit is used as it is to be integrated into a single chip with the recording/reproducing IC as described above, the following problem occurs. When a recording driver included in the recording/reproducing IC operates, an input offset voltage Voff occurs at the operational amplifier 112, as shown in the equivalent circuit of FIG. 5. The impact sensor 111 is a capacitance in terms of the equivalent circuit. Hence, the input offset voltage Voff is inputted to the integrating circuit 115 as a current differentiated by the capacitance of the impact sensor 111.

An experiment by the present inventor shows that the current reaches 100 nA or greater. As a result, letting Ch be a capacitance value of the capacitor 113 and Rh be a resistance value of the resistance 114, a large voltage waveform with a time constant Ch*Rh is generated at an output terminal of the integrating circuit 115, as shown in the waveform diagram of FIG. 6. Thus, an erroneous detection occurs each time the recording driver is operated in the recording mode.

The above problem can be solved if the input offset voltage Voff itself is eliminated. However, the input offset voltage Voff is caused by noise within the recording/reproducing IC resulting from the operation of the recording driver. It is therefore difficult to reduce the input offset voltage Voff to 0 mV. There will be a trend in the future for the input offset voltage Voff to be increased with an increase in the speed of the recording driver. The input offset voltage Voff thus presents a problem in integrating the impact detecting circuit into a single chip with the recording/reproducing IC.

SUMMARY OF THE INVENTION

The present invention has been made in view of the above problem, and it is accordingly an object of the present invention to provide an impact detecting circuit, an impact detecting apparatus, and a recording and reproducing apparatus including the same that can eliminate erroneous detection resulting from the input offset voltage Voff of the integrating circuit and perform impact detection more reliably when the impact detecting circuit is integrated into a single chip with the recording/reproducing IC.

According to the present invention, there is provided an impact detecting circuit which includes: a first integrating circuit and a second integrating circuit connected to both terminals of an impact detecting sensor for integrating outputs of both the terminals; a differential circuit for obtaining a difference between integrated outputs of the integrating circuits; and a comparator for outputting a detection signal when a differential output level of the differential circuit is at a threshold level and higher. The impact detecting circuit, together with the impact sensor, is used in a state of being included within an enclosure of a recording and reproducing apparatus, such as an HDD apparatus or the like.

In the thus formed impact detecting circuit or the recording and reproducing apparatus including the impact detecting circuit together with the impact sensor, when the input offset voltage occurs in the first and second integrating circuits, a large voltage waveform is generated at the output terminal of each of the integrating circuits. The voltage waveform is cancelled out by obtaining the difference by the differential circuit in the next stage. Thus, a signal resulting from the input offset voltage of the integrating circuits does not appear in the output terminal of the differential circuit.

In essential impact detection, on the other hand, when first-order differential currents in proportion to the strength of an impact are outputted from both the terminals of the impact sensor in opposite polarity, the currents are integrated by the first and second integrating circuits and converted into voltages with a flat frequency characteristic, and then a difference between the voltages is obtained by the differential circuit. In this case, since both the signals are of opposite polarity, the difference obtained between the signals appears in the output terminal of the differential circuit as a double-level signal. Then, the comparator compares the signal with the threshold level, whereby impact detection is performed.

DETAILED DESCRIPTION OF THE PREFERRED EMBODIMENTS

A preferred embodiment of the present invention will hereinafter be described in detail with reference to the drawings.

Figure 1:
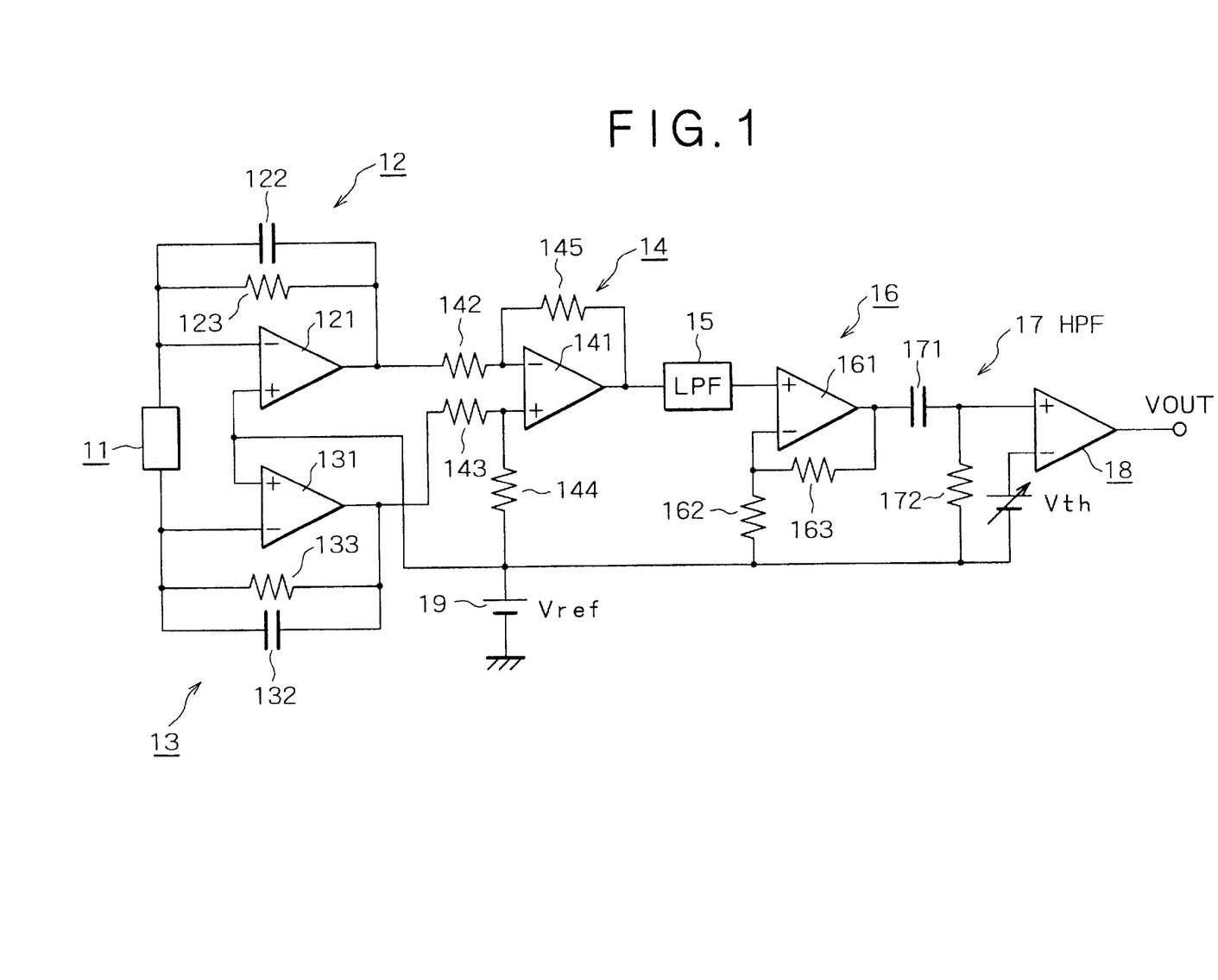
FIG. 1 is a circuit diagram showing an impact detecting circuit according to an embodiment of the present invention.

FIG. 1 is a circuit diagram showing an impact detecting circuit according to an embodiment of the present invention. As shown in FIG. 1, the impact detecting circuit according to the present embodiment has first and second integrating circuits 12 and 13, a differential amplifier 14, an LPF 15, an amplifier 16, an HPF 17, and a comparator 18, for an impact sensor 11.

The first integrating circuit 12 includes an operational amplifier 121 and a capacitor 122 and a resistance 123 connected in parallel with each other between an inverting input terminal and an output terminal of the operational amplifier 121. The first integrating circuit 12 is connected to one terminal of the impact sensor 11. The second integrating circuit 13 includes an operational amplifier 131 and a capacitor 132 and a resistance 133 connected in parallel with each other between an inverting input terminal and an output terminal of the operational amplifier 131. The second integrating circuit 13 is connected to another terminal of the impact sensor 11. A non-inverting input terminal of each of the operational amplifiers 121 and 131 is supplied with a reference voltage Vref from a reference voltage source 19.

The differential amplifier 14 includes: an operational amplifier 141; resistances 142 and 143 connected between an inverting and a non-inverting input terminal of the operational amplifier 141 and output terminals of the first and second integrating circuits 12 and 13 (that is, the output terminals of the operational amplifiers 121 and 131), respectively; a bias resistance 144 connected between the non-inverting input terminal of the operational amplifier 141 and the reference voltage source 19; and a feedback resistance 145 connected between the inverting input terminal and an output terminal of the operational amplifier 141.

The LPF 15 has a function of cutting off a high-frequency component unnecessary for impact detection from an output signal of the differential amplifier 14. The amplifier 16 includes: an operational amplifier 161; a bias resistance 162 connected between an inverting input terminal of the operational amplifier 161 and the reference voltage source 19; and a feedback resistance 163 connected between the inverting input terminal and an output terminal of the operational amplifier 161. The amplifier 16 receives the output signal of the differential amplifier 14 passed through the LPF 15 as a non-inverting input.

The HPF 17 includes a capacitor 171 and a resistance 172. Having a sufficiently low cutoff frequency, the HPF 17 functions to eliminate a DC offset from an output signal of the amplifier 16. The comparator 18 receives the output signal of the amplifier 16 passed through the HPF 17 as a non-inverting input thereof and receives a threshold level Vth as an inverting input thereof. When the output level of the amplifier 16 is at the threshold level Vth or higher, the comparator 18 outputs a high-level detection signal VOUT.

Circuit operation of the thus formed impact detecting circuit will be described next. Consideration will first be given to a case where an input offset voltage Voff, as described above, occurs in the first and second integrating circuits 12 and 13.

Figure 6:
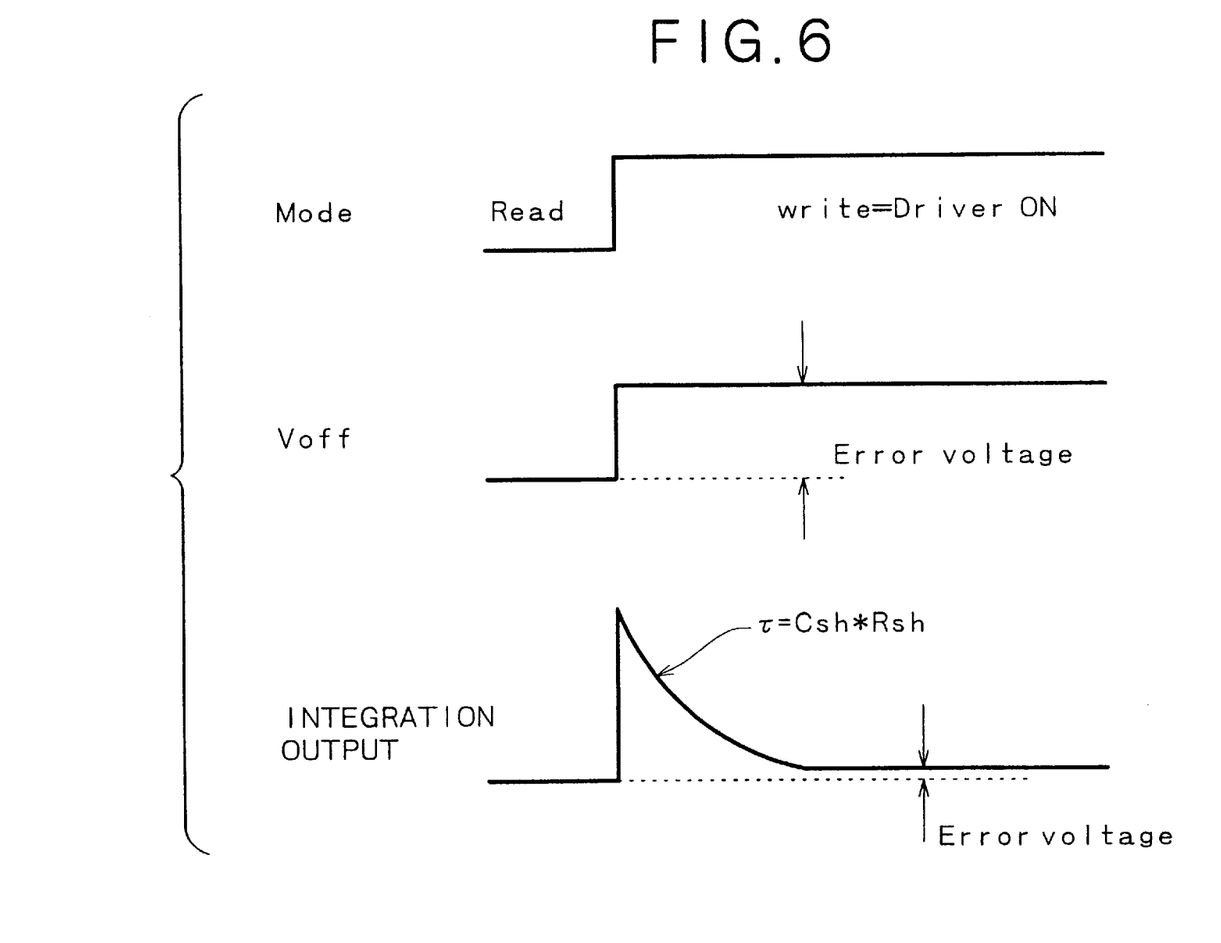
FIG. 6 is a waveform diagram of assistance in explaining a conventional problem.

When the input offset voltage Voff occurs in the first and second integrating circuits 12 and 13, a large voltage waveform is generated at the output terminal of each of the integrating circuits 12 and 13 (see the waveform diagram of FIG. 6). The voltage waveforms are generated at the output terminals of the integrating circuits 12 and 13 in phase with each other. It is assumed in this case that the constants of the circuit components of the first and second integrating circuits 12 and 13 are set so as to make the amplitudes of the voltage waveforms equal to each other.

The outputs of the first and second integrating circuits 12 and 13 are subjected to differential amplification by the differential amplifier 14 in the next stage. Hence, the voltage waveforms of the integrating circuits 12 and 13 resulting from the input offset voltage Voff cancel each other out in the differential amplifier 14, and, therefore, a signal resulting from the input offset voltage Voff does not appear in the output terminal of the differential amplifier 14. It is to be noted that while in this example both integration outputs of the first and second integrating circuits 12 and 13 are subjected to differential amplification, the integration outputs of the first and second integrating circuits 12 and 13 do not necessarily need to be amplified, and a configuration for at least obtaining a difference between the integration outputs suffices.

In essential impact detection, on the other hand, when first-order differential currents in proportion to impact strength are outputted from both the terminals of the impact sensor 11 in opposite polarity, the currents are subjected to first-order integration by the first and second integrating circuits 12 and 13 and are converted into voltages with a flat frequency characteristic and then subjected to differential amplification by the differential amplifier 14, whereby the result appears in the output terminal of the differential amplifier 14 as a double-level signal.

The LPF 15 cuts off a high-frequency component unnecessary for impact detection from the output signal of the differential amplifier 14, and then the result is amplified by the amplifier 16. The HPF 17, having a sufficiently low cutoff frequency, eliminates a DC offset component, and then the result is supplied to the comparator 18 as a non-inverting input of the comparator 18. The comparator 18 compares the non-inverted input with the threshold level Vth to thereby perform impact detection. An impact detection level is set by adjusting the threshold level Vth.

As described above, in the impact detecting apparatus including the impact detecting circuit and the impact sensor 11, the first and second integrating circuits 12 and 13 are connected to both the terminals of the impact sensor 11, respectively, a difference between the integration outputs of the integrating circuits 12 and 13 is obtained by the differential amplifier 14, and impact detection is performed on the basis of the differential output of the differential amplifier 14. Hence, the voltage waveforms of the output terminals of the integrating circuits 12 and 13 resulting from the input offset voltage Voff cancel each other out, and, therefore, a signal resulting from the input offset voltage Voff does not appear in the output terminal of the differential amplifier 14. It is thus possible to perform a more accurate detection operation without erroneous detection due to the input offset voltage Voff.

In addition, the impact detecting circuit formed by a combination of the impact sensor 11 and the integrating circuits detects an impact as a current. As is clear from FIG. 4, in the case of the conventional impact detecting circuit, the current is detected only by the integrating circuit 115 at one terminal of the impact sensor 111. In the case of the impact detecting circuit according to the present embodiment, on the other hand, the current is detected as currents of opposite polarity by the two integrating circuits 12 and 13 at both the terminals of the impact sensor 11, and then the difference between the currents is obtained by the differential amplifier 14. Therefore, it is possible to double the signal level, thus doubling S/N in principle.

The impact detecting circuit according to the present embodiment, as described above, is included with an impact sensor 2 in an enclosure 1 of a recording and reproducing apparatus, for example, an HDD apparatus as shown in FIG. 3. Preferably, the impact detecting circuit is included in the enclosure 1 in a state of either being integrated into a single chip with a recording/reproducing IC 3 or being integrated on a single chip with the recording/reproducing circuit. When the impact sensor 2 is disposed within the enclosure 1, an impact can be detected more accurately by mounting the impact sensor 2 on a metallic chassis, for example, a head arm 4.

Figure 2:
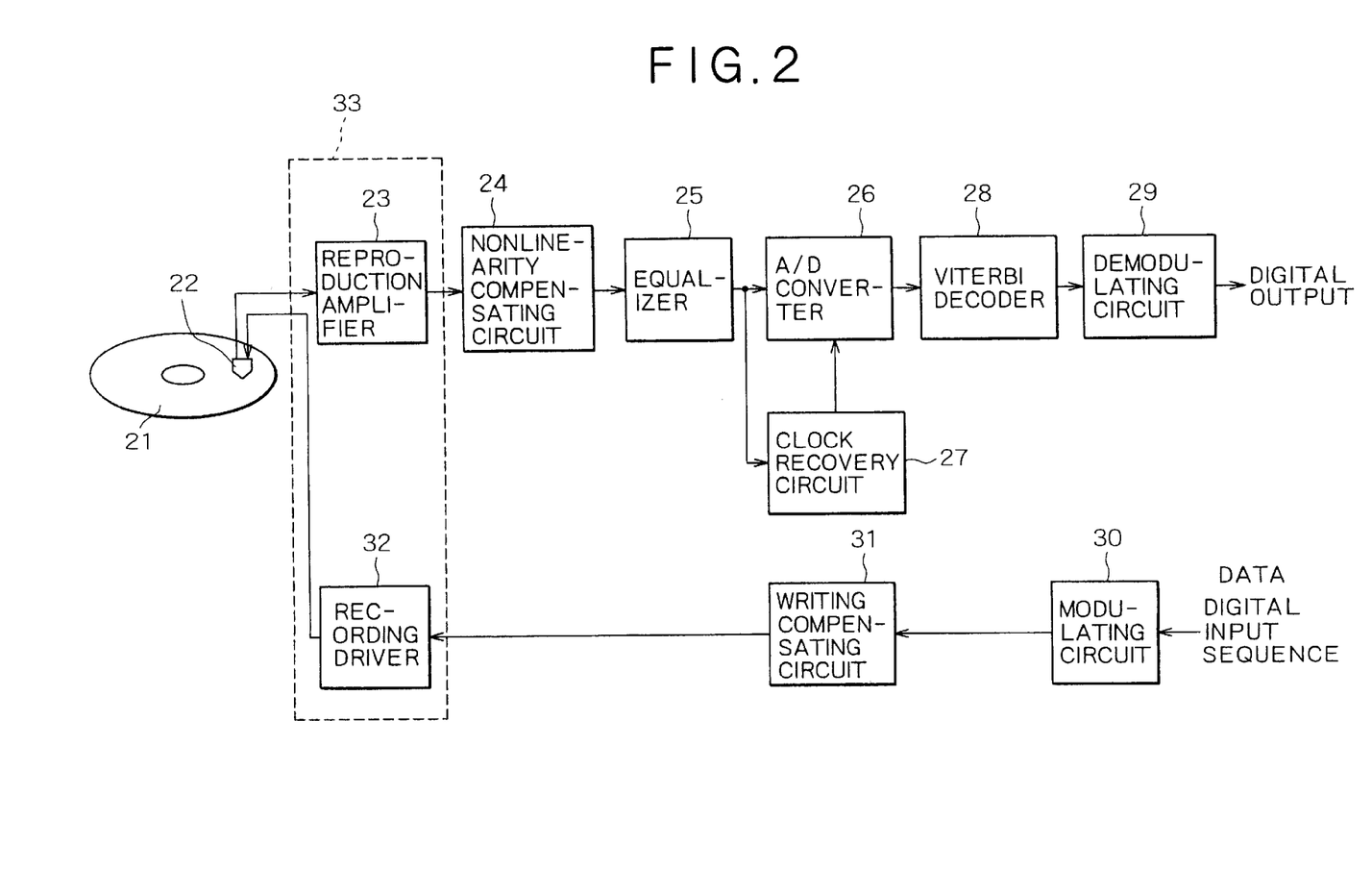
FIG. 2 is a block diagram showing an example of a configuration of a high-density recording and reproducing apparatus employing a PRML system.

An example of a configuration of a high-density recording and reproducing apparatus employing a PRML (Partial Response Maximum Likelihood) system, for example, as the recording and reproducing apparatus is shown in FIG. 2.

A disk-shaped recording medium 21 in FIG. 2 has information recorded thereon to be read by a head unit 22. A reproduced signal outputted from the head unit 22 is passed through a reproduction amplifier 23 and supplied to a nonlinearity compensating circuit 24. The reproduced signal subjected to nonlinearity compensation by the nonlinearity compensating circuit 24 is subjected to frequency characteristic compensation by an equalizer 25 and then is supplied to an A/D converter 26 and a clock recovery circuit 27. The clock recovery circuit 27 generates a clock in synchronism with the reproduced signal passed through the equalizer 25 on the basis of the reproduced signal.

The clock generated by the clock recovery circuit 27 is supplied to the A/D converter 26 as a sampling clock of the A/D converter 26. The A/D converter 26 converts the reproduced signal into digital data by sampling the reproduced signal in synchronism with the sampling clock supplied from the clock recovery circuit 27. The digital data obtained by the A/D conversion by the A/D converter 26 is subjected to Viterbi decoding by a Viterbi decoder 28 and further demodulated by a demodulating circuit 29 for output.

In a recording system (writing system), on the other hand, data (digital input sequence) is subjected to modulation by a modulating circuit 30, further subjected to writing compensation by a writing compensating circuit 31, and thereafter supplied to the head unit 22 through a recording driver 32. Then, the head unit 22 writes (records) the information on the recording medium 21. The reproduction amplifier 23 and the recording driver 32 form a recording/reproducing circuit 33, and, they are integrated into a circuit included as the recording/reproducing IC 3 in FIG. 3 in the apparatus enclosure.

In the thus formed high-density recording and reproducing apparatus, an impact detecting sensor is included within the apparatus enclosure and the impact detecting sensor is mounted on a metallic chassis. The impact sensor can therefore detect an impact more reliably through the chassis. In addition, since the impact sensor is disposed near the periphery of the head unit 22 to be protected from an impact, it is possible to securely protect from an impact the operation of the head unit 22 in a recording mode, in particular.

Furthermore, by including the impact detecting circuit according to the foregoing embodiment within the apparatus enclosure together with the impact sensor, the impact detecting circuit and the impact detecting sensor can be disposed at a short distance from each other, and therefore the signal transmission distance between the impact detecting circuit and the impact detecting sensor can be shortened. Therefore, it also is possible to prevent erroneous operation due to noise. In addition, since the impact detecting circuit is free from erroneous detection resulting from the input offset voltage Voff, the impact detecting circuit can be integrated into a single chip with the already included recording/reproducing IC. Thus, the impact detecting circuit can be included securely in a small enclosure.

As described above, according to the present invention, in the impact detecting apparatus including the impact detecting circuit and the impact sensor, the two integrating circuits are connected to both terminals of the impact sensor, respectively, a difference between the integration outputs of the two integrating circuits is obtained by the differential circuit, and impact detection is performed on the basis of the differential output of the differential circuit. Hence, the voltage waveforms occurring in the output terminals of the two integrating circuits resulting from the input offset voltage cancel each other out, and therefore a signal resulting from the input offset voltage does not appear in the output terminal of the differential circuit. It is thus possible to perform a more accurate detection operation without an erroneous detection due to the input offset voltage.

While the preferred embodiments of the present invention have been described using the specific terms, such description is for illustrative purposes only, and it is to be understood that changes and variations may be made without departing from the spirit or scope of the following claims.

What is claimed is:

1. An impact detecting circuit for detecting an impact on the basis of an output signal of an impact sensor, said impact detecting circuit comprising:
    a first integrating circuit and a second integrating circuit connected to both terminals of said impact detecting sensor for integrating outputs of both the terminals;
    a differential circuit for obtaining a difference between integrated outputs of said first integrating circuit and said second integrating circuit; and
    a comparator for outputting a detection signal when a differential output level of said differential circuit is at a threshold level and higher.

2. An impact detecting circuit as claimed in claim 1, wherein a constant of each circuit component of said first integrating circuit and a constant of each circuit component of said second integrating circuit are set equal to each other.

3. An impact detecting circuit as claimed in claim 1, further including:
    an LPF (Low Pass Filter) connected to an output of said differential circuit;
    an amplifier connected to an output of said LPF; and
    an HPF (High Pass Filter) connected to an output of said amplifier and connected to an input of said comparator.

4. An impact detecting circuit as claimed in claim 1, wherein said threshold level is variable.

5. An impact detecting apparatus comprising:
    an impact sensor;
    a first integrating circuit and a second integrating circuit connected to both terminals of said impact detecting sensor for integrating outputs of both the terminals;
    a differential circuit for obtaining a difference between integrated outputs of said first integrating circuit and said second integrating circuit; and
    a comparator for outputting a detection signal when a differential output level of said differential circuit is at a threshold level and higher.

6. An impact detecting apparatus as claimed in claim 5, wherein a constant of each circuit component of said first integrating circuit and a constant of each circuit component of said second integrating circuit are set equal to each other.

7. An impact detecting apparatus as claimed in claim 5, further including:
    an LPF (Low Pass Filter) connected to an output of said differential circuit;
    an amplifier connected to an output of said LPF; and
    an HPF (High Pass Filter) connected to an output of said amplifier and connected to an input of said comparator.

8. An impact detecting apparatus as claimed in claim 5, wherein said threshold level is variable.

9. A recording and reproducing apparatus comprising:
    a disk-shaped recording medium;
    a head unit for recording information on said disk-shaped recording medium and reproducing the recorded information of said disk-shaped recording medium;
    an impact sensor included within an enclosure together with said disk-shaped recording medium and said head unit; and
    an impact detecting circuit included within the enclosure together with said disk-shaped recording medium and said head unit, for detecting an impact on the basis of an output signal of said impact sensor;
    wherein said impact detecting circuit includes:
    a first integrating circuit and a second integrating circuit connected to both terminals of said impact detecting sensor for integrating outputs of both the terminals;
    a differential circuit for obtaining a difference between integrated outputs of said first integrating circuit and said second integrating circuit; and
    a comparator for outputting a detection signal when a differential output level of said differential circuit is at a threshold level and higher.

10. A recording and reproducing apparatus as claimed in claim 9, wherein said impact detecting circuit is integrated into a circuit on a single chip with a recording/reproducing circuit for performing signal processing for said head unit.

11. A recording and reproducing apparatus as claimed in claim 9, further including:
    an LPF (Low Pass Filter) connected to an output of said differential circuit;
    an amplifier connected to an output of said LPF; and
    an HPF (High Pass Filter) connected to an output of said amplifier and connected to an input of said comparator.

12. A recording and reproducing apparatus as claimed in claim 9, wherein said threshold level is variable.

13. A recording and reproducing apparatus as claimed in claim 9, wherein said impact detecting sensor is on a head arm unit.

14. A recording and reproducing apparatus as claimed in claim 10, further including:
    a nonlinearity compensating circuit connected to said recording/reproducing circuit;
    an equalizer connected to said nonlinearity compensating circuit;
    a clock recovery circuit connected to an output of said equalizer; and
    an A/D converter connected to the output of said equalizer for performing analog-to-digital conversion on the basis of an output signal from said clock recovery circuit.

* * * * *